(12) United States Patent
Hayashi (10) Patent No.: US 6,920,668 B2
(45) Date of Patent: Jul. 26, 2005

(54) HINGE UNIT AND ELECTRONIC APPARATUS UNIT

(75) Inventor: Yoshitaka Hayashi, Kawagoe (JP)

(73) Assignee: Kabushiki Kaisha Strawberry Corporation (JP)

( * ) Notice: Subject to any disclaimer, the term of this patent is extended or adjusted under 35 U.S.C. 154(b) by 0 days.

(21) Appl. No.: 10/487,674

(22) PCT Filed: Nov. 26, 2001

(86) PCT No.: PCT/JP01/10261

§ 371 (c)(1),
(2), (4) Date: Feb. 25, 2004

(87) PCT Pub. No.: WO03/021118

PCT Pub. Date: Mar. 13, 2003

(65) Prior Publication Data

US 2004/0216275 A1 Nov. 4, 2004

(30) Foreign Application Priority Data

Aug. 29, 2001 (JP) ........................................ 2001-259686

(51) Int. Cl.$^7$ .............................. E05F 1/08; E05F 11/10
(52) U.S. Cl. ....................... 16/303; 16/330; 379/433.13
(58) Field of Search .......................... 16/303, 330, 304, 16/305, 306, 329, 331; 379/433.13, 428.02; 455/90.3, 90.1, 550.1, 575.1, 575.3

(56) References Cited

U.S. PATENT DOCUMENTS 5,628,089 A * 5/1997 Wilcox et al. ................. 16/303

(Continued)

FOREIGN PATENT DOCUMENTS

JP         03-186607         8/1991

(Continued)

OTHER PUBLICATIONS

International Search Report No. PCT/JP01/10261 dated Feb. 8, 2002.

*Primary Examiner*—Chuck Y. Mah
(74) *Attorney, Agent, or Firm*—Connolly Bove Lodge & Butz LLP (57) ABSTRACT

According to the present invention, a hinge device which may be mounted with one action without fixing and mounting the hinge device with any other discrete part and is superior in mounting work, in which a cam portion 4 is provided within a mounting case body 3 in a rotation preventing manner, the cam portion 4 is provided slidably movably within the mounting case body 4 against an engagement biasing spring 5 provided within the mounting case body 3, a cam engagement portion 6 for engaging with the cam portion 4 by the engagement biasing spring 5 is provided in confrontation with the cam portion 4, the cam engagement portion 4 or a mounting portion provided in the cam engagement portion 6 is provided projectingly on one side of the mounting case body 3, the mounting case body 3 is provided in a fixed condition to the first member 1, the cam engagement portion 6 or the mounting portion provided in the cam engagement portion 6 is provided in a fixed condition to the second member 2, when the second member 2 is rotated to the first member 1, the cam portion 4 and the cam engagement portion 6 are disengaged and rotated to each other while the cam portion 4 is separated against the engagement biasing spring 5 and a rotational position of the second member 2 is held to the first member 1 under the condition that the cam portion 4 and the cam engagement portion 6 are biased and engaged with each other, characterized in that the cam engagement portion 6 provided on one side of the mounting case body 3 or the mounting portion provided in the cam engagement portion 6 is slidably movably (retractably and movably) provided together with the cam portion 4 against the engagement biasing spring 5 toward the inside of the mounting case body 3 so that the cam engagement portion 6 or the mounting portion is fixed to the second member 2 with one action by the retracting motion and by the returning and restoring motion of the engagement biasing spring 5.

2 Claims, 5 Drawing Sheets

U.S. PATENT DOCUMENTS

| | | | | |
|---|---|---|---|---|
| 5,761,300 | A | * 6/1998 | Domoleczny | 379/433.13 |
| 5,799,371 | A | 9/1998 | Lin | |
| 5,987,122 | A | * 11/1999 | Daffara et al. | 379/433.13 |
| 6,065,187 | A | * 5/2000 | Mischenko | 16/341 |
| 6,070,298 | A | * 6/2000 | Sorimachi | 16/330 |
| 6,148,480 | A | * 11/2000 | Cooke | 16/303 |
| 6,493,542 | B1 | * 12/2002 | Frohlund | 455/90.1 |
| 6,658,699 | B2 | * 12/2003 | Huong | 16/330 |
| 6,789,292 | B2 | * 9/2004 | Oshima et al. | 16/297 |
| 6,802,107 | B2 | * 10/2004 | Pan | 16/325 |
| 6,808,402 | B2 | * 10/2004 | Ryu et al. | 439/165 |

FOREIGN PATENT DOCUMENTS

| | | | | |
|---|---|---|---|---|
| JP | 05-026227 | | 2/1993 | |
| JP | 07-098011 | | 4/1995 | |
| JP | 10311327 | A * | 11/1998 | F16C/11/10 |
| JP | 2000192939 | A * | 7/2000 | F16C/11/04 |
| JP | 2004060697 | A * | 2/2004 | F16C/11/10 |
| JP | 2004183698 | A * | 7/2004 | F16C/11/10 |
| WO | WO 2003044974 | A1 * | 5/2003 | H01H/7/08 |

* cited by examiner

HINGE UNIT AND ELECTRONIC APPARATUS UNIT

TECHNICAL FIELD

The present invention relates to a hinge device for pivotally coupling a first member and a second member, a hinge device in which, for example, proximal end portions of the first member and the second member are pivotally coupled with each other and the first member and the second member may be closed or opened from a closed condition where both members are closed to an open condition where either one of the first and second members is rotated to a predetermined opening angle, and an electronic instrument such as, for example, a portable phone or a note-type personal computer using the hinge device.

BACKGROUND ART

A variety of hinge devices have been proposed. A body and a flip of a portable phone or a body and a cover of a note-type personal computer are pivotally coupled by a hinge device basically having the following structure.

A cam portion is provided within a mounting case member in a rotation preventing manner. This cam portion is slidably movably provided within the mounting case member against an engagement biasing spring provided within the mounting case. A cam engagement portion to be engaged with the cam portion by the engagement biasing spring is provided in confrontation with this cam portion. This cam engagement portion is projectingly provided on one side of the mounting case member. The mounting case member is provided in a fixed condition to either the first member or the second member. When the second member is rotated to the first member, the cam portion and the cam engagement portion are disengaged from each other and rotated relative to each other while the cam portion is separated against the engagement biasing spring. Under the condition that the cam portion and the cam engagement portion are biased and engaged with each other, the rotational position of the second member may be kept to the first member.

It is therefore possible to realize a "free stop" for stopping and keeping in the rotational position under the condition that the hand is released upon the rotation in the disengagement position by, for example, the engagement spring. Also, the cam is engaged in the rotational position in which the second member is opened at a predetermined angle so that the rotational position is locked. Also, under a coupled and closed condition, the cam is on the way in engagement so that the closing bias may take place.

On the other hand, conventionally, in such a hinge device, for example, a mounting hole provided in the first member and a communication mounting hole provided in the second member are arranged in communication with each other. The hinge device is inserted from one side so that the mounting case member is fitted in the mounting hole in a rotation preventing manner and the cam engagement portion is fitted in the communication mounting hole in a rotation preventing manner. Thereafter, the hinge device is secured by screws from the outside to prevent the pull-apart.

For this reason, after the hinge device has been assembled (after it has been inserted into an assembling portion), it is necessary to fixed it with discrete parts (such as rivets or pins). Accordingly, the mounting work is troublesome and it is impossible to perform the mounting work with one action.

Accordingly, in order to overcome the above-noted problems, an object of the present invention is to provide a novel hinge device which may be mounted with one action, extremely superior in mounting work and in practical usability and an electronic instrument using the hinge device by a retractable motion and an automatic return motion without fixing the hinge device by any discrete part device while paying attention to the structure where at least one cam portions engaging with each other is slidably moved against an engagement spring, implementing such improvement that the other cam engagement portion is also moved against the spring together with the cam portion, implementing such improvement that the cam engagement portion projecting on one side of a mounting case member or a mounting portion provided on this may be retractably moved.

DISCLOSURE OF THE INVENTION

A hinge device for coupling a first member 1 and a second member 2, in which a cam portion 4 is provided within a mounting case body 3 in a rotation preventing manner, the cam portion 4 is provided slidably movably within the mounting case body 4 against an engagement biasing spring 5 provided within the mounting case body 3, a cam engagement portion 6 for engaging with the cam portion 4 by the engagement biasing spring 5 is provided in confrontation with the cam portion 4, the cam engagement portion 6 or a mounting portion provided in the cam engagement portion 6 is provided projectingly on one side of the mounting case body 3, the mounting case body 3 is provided in a fixed condition to either the first member 1 or the second member 2, the cam engagement portion 6 or the mounting portion provided in the cam engagement portion 6 is provided in a fixed condition to the other member, when the second member 2 is rotated to the first member 1, the cam portion 4 and the cam engagement portion 6 are disengaged and rotated to each other while the cam portion 4 is separated against the engagement biasing spring 5 and a rotational position of the second member 2 is held to the first member 1 under the condition that the cam portion 4 and the cam engagement portion 6 are biased and engaged with each other, is characterized in that a rotary shaft 10 passing through the cam portion 4 and the cam engagement portion 6 engaging with each other is arranged in an axial direction within the mounting case body 3, and the cam engagement portion 6 projecting from one end side of the mounting case body 3 and moving toward the inside of the mounting ease body 3 against the engagement biasing spring 5 together with the cam portion 4 engaging with the cam engagement portion 6 and moving together with the rotary shaft 10 by pushing on the opposite side the cam engagement portion 6 provided on one end side of the rotary shaft 10 or the mounting portion is adapted to move in a retracting direction, the mounting case body 3 is adapted so that the mounting case body may be inserted and engaged with a case mounting portion 8 such as a mounting hole or a mounting recess portion provided in the first member 1 or the second member 2 and mounted in a fixed condition, an allowance recess portion 13 for allowing the rotary shaft to project from the case mounting portion is provided on an insertion bottom side of the case mounting portion 8, the cam engagement portion 6 or the mounting portion provided in the cam engagement portion 6 is projected, inserted, mounted and engaged in a fixed condition to a communication mounting portion 9 such as a mounting recess portion or a mounting hole in communication with the case mounting portion 8 and provided in the second member 2 or the first member 1, after the mounting case body 3 is engaged with the case mounting portion 8, the case mounting portion 8 and the communication mounting portion 9 are kept in communication with each other under the condition that the cam engagement portion 6 or the mounting portion is moved slidably together with the cam portion 4 against the engagement biasing spring 5 toward the inside of the mounting case body 3 and at the same time, the rotary shaft 10 is projected from the mounting case body 3 through an allowance recess portion 13 of the case mounting portion and the cam engagement portion 6 or the mounting portion is returned or restored by the engagement biasing spring 5 so that the cam engagement portion 6 or the mounting portion is engaged with the communication mounting portion 9 and mounted on a pivot coupling portion of the first member 1 and the second member 2.

Also, an electronic instrument characterized in that a pivot coupling portion for the first member 1 and the second member 2 is provided with the hinge device H as described in claim 1.

BEST MODE FOR EMBODYING THE INVENTION

Figure 1:
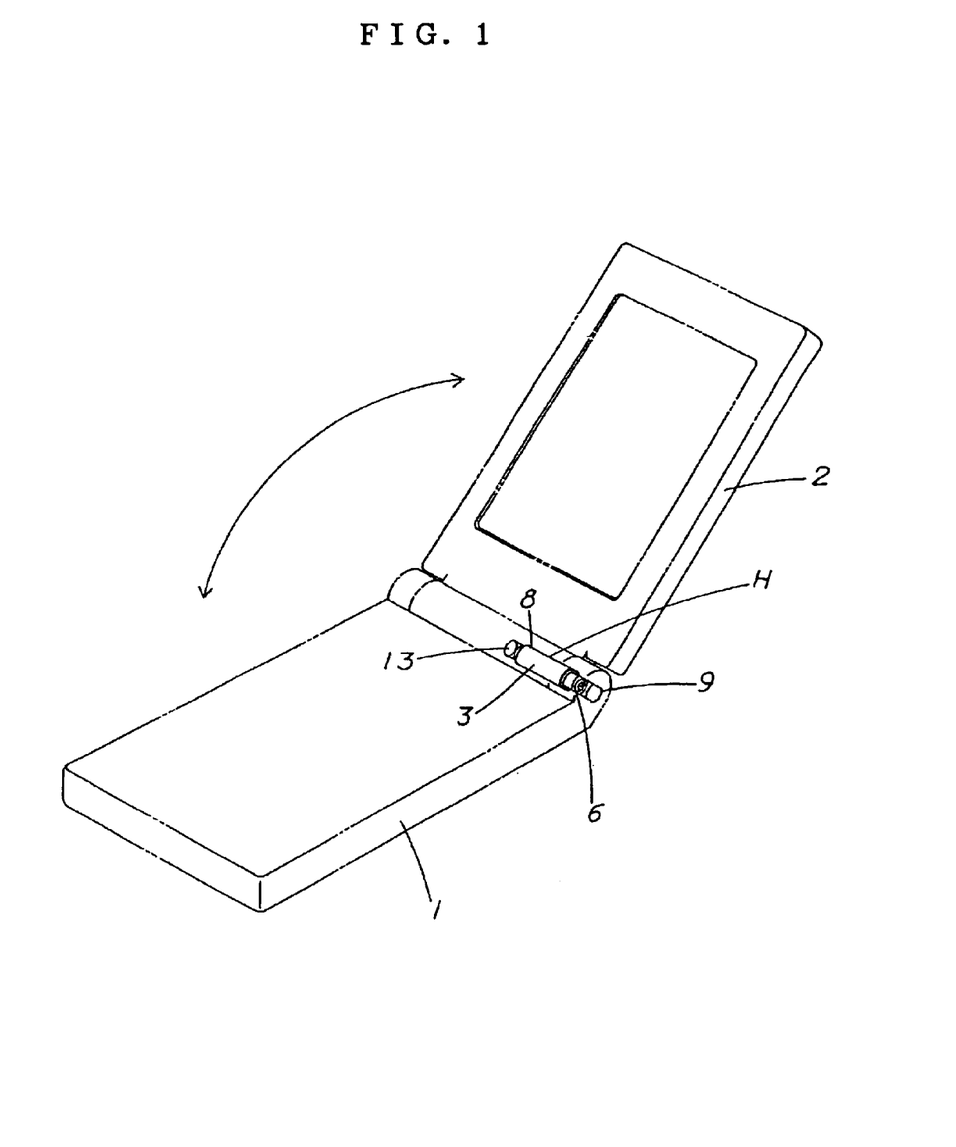
FIG. 1 is an illustrative perspective view showing a use condition of an embodiment.
Figure 2:
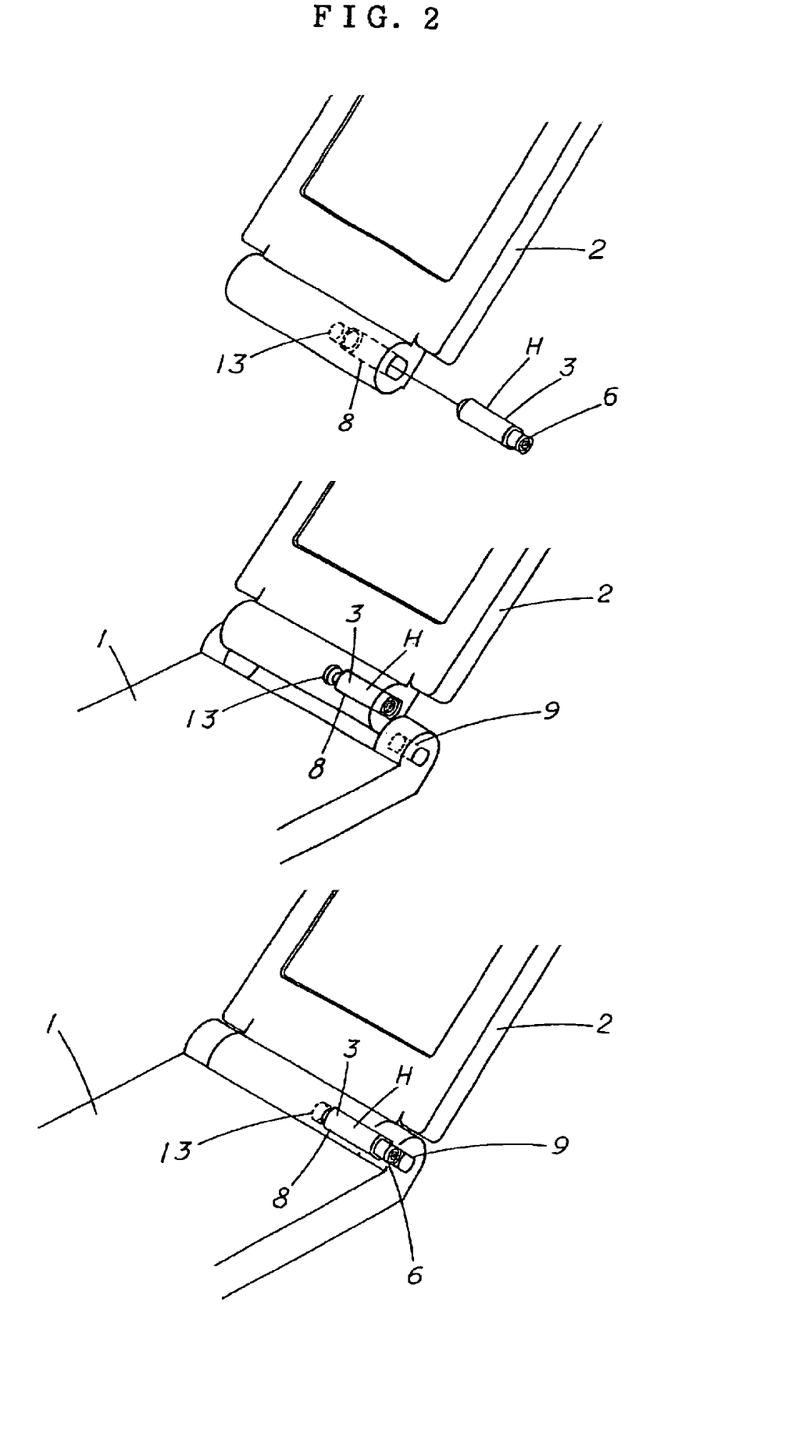
FIG. 2 is an operative illustration upon mounting of one action mounting steps in the embodiment.
Figure 3:
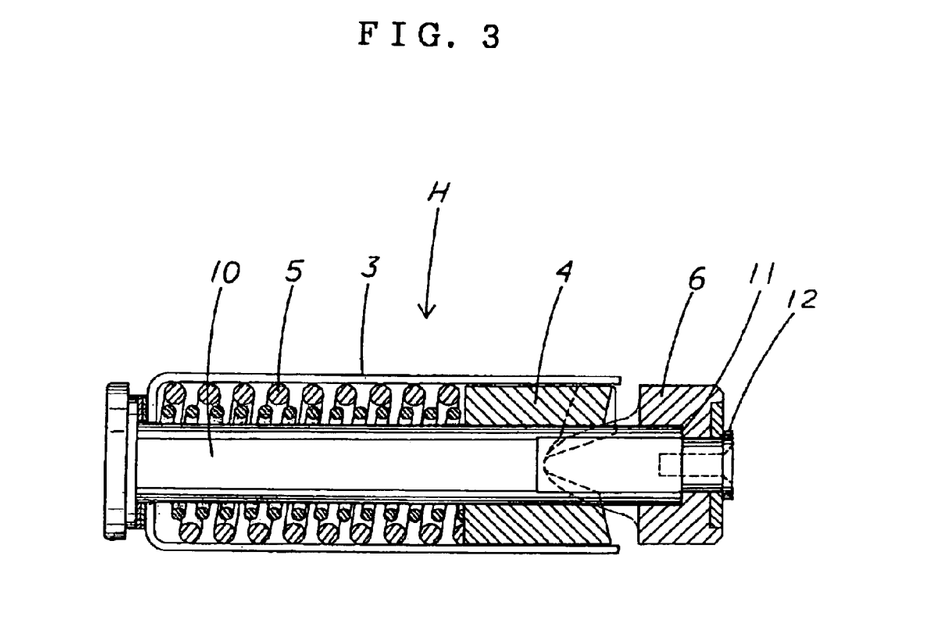
FIG. 3 is an illustrative cross-sectional view showing a rotational position lock condition in the embodiment.
Figure 4:
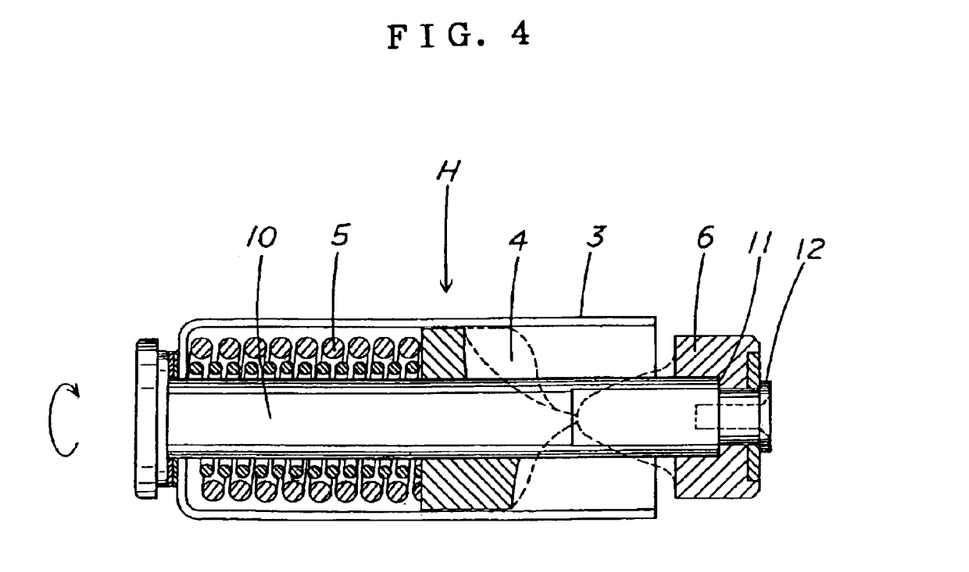
FIG. 4 is an illustrative cross-section in the midway in rotation in the embodiment.
Figure 5:
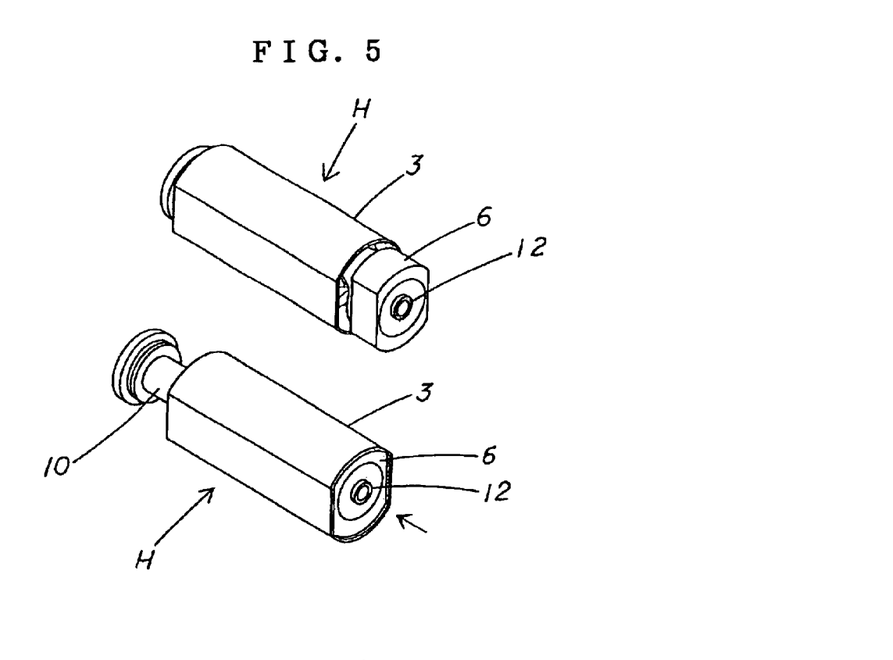
FIG. 5 is illustrative perspective views showing the condition before and where the cam engagement portion is retracted and moved upon the mounting operation in the embodiment.
Figure 6:
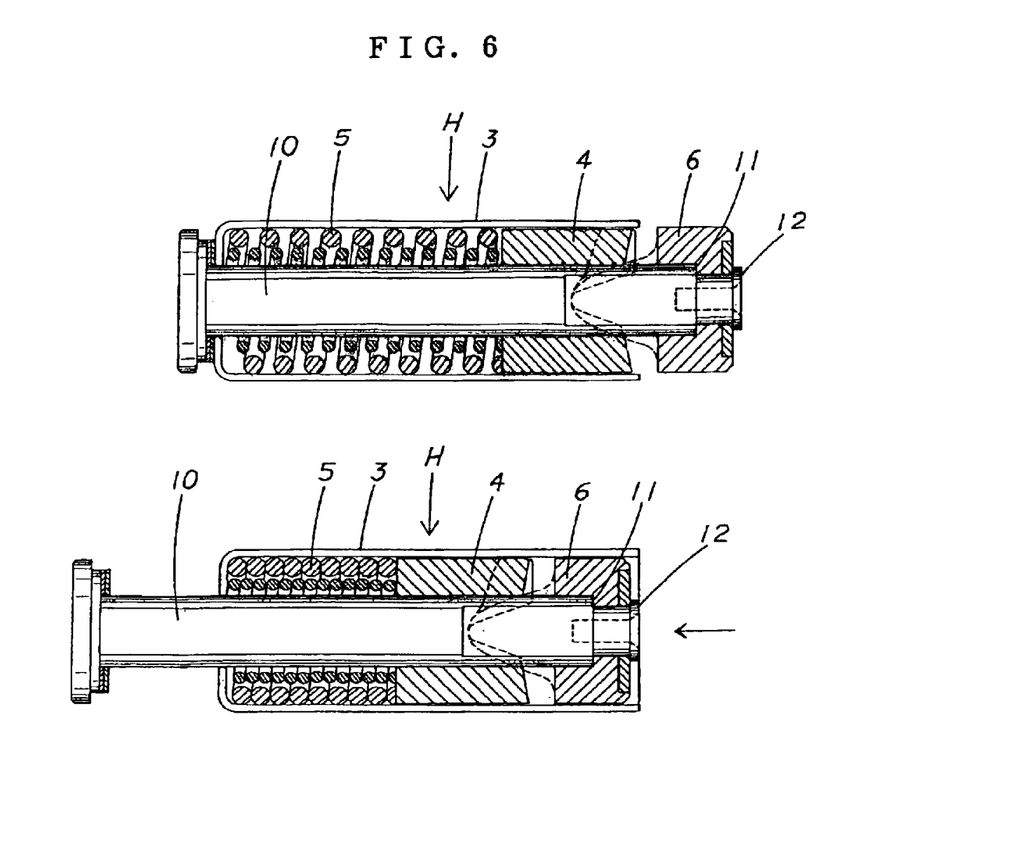
FIG. 6 is illustrative cross-sections showing the condition before and where the cam engagement portion is retracted and moved upon the mounting operation in the embodiment.
Figure 7:
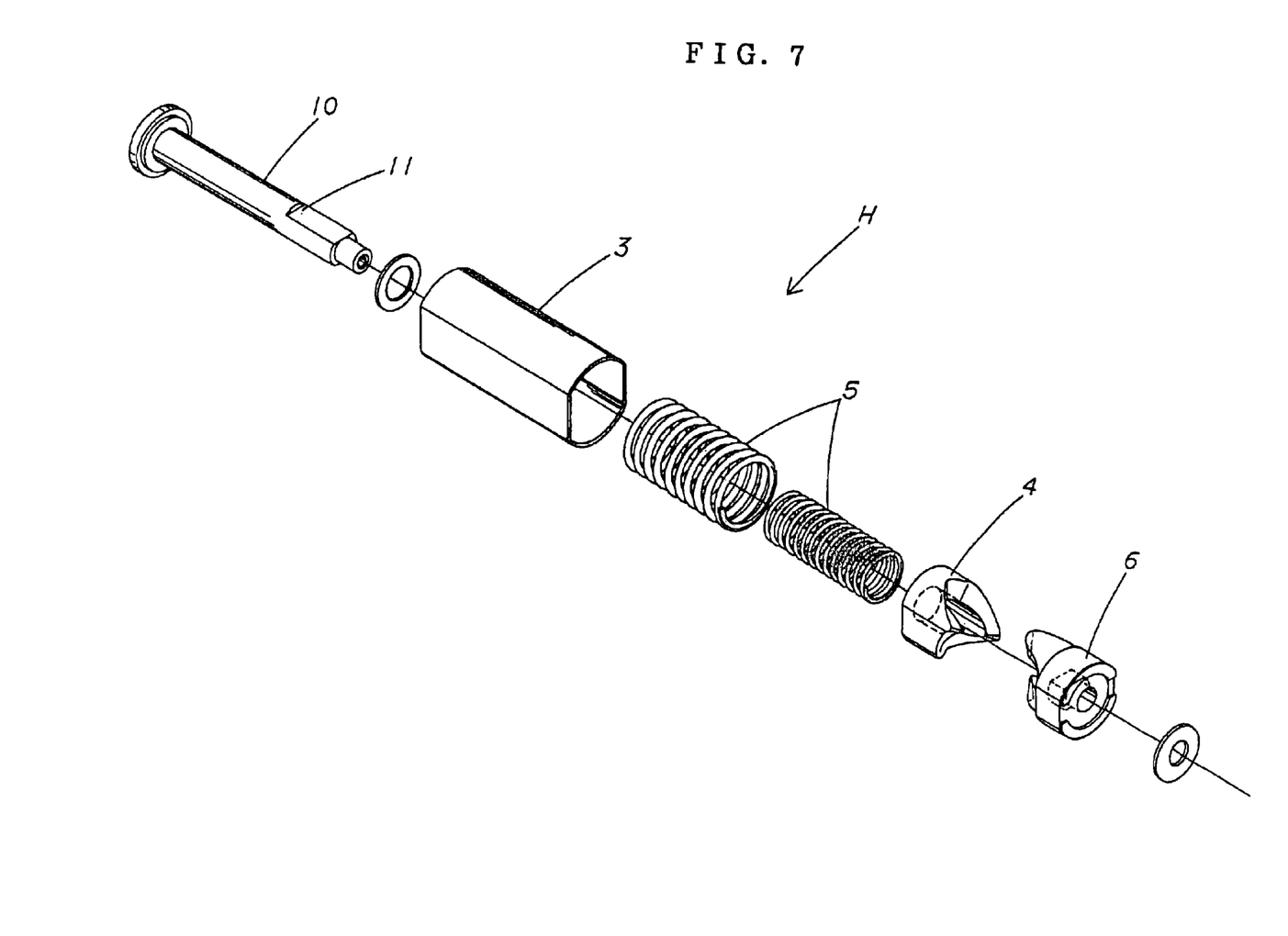
FIG. 7 is an exploded perspective view of the embodiment.

A best mode of an embodiment of the invention (how to embody the invention) will now be described briefly while showing the resultant effect with reference to the drawings.

For example, in the case where base portions of a first member 1 and a second member 2 are pivotally coupled with each other by using a hinge device H, a case mounting portion 8 such as a mounting hole or a mounting recess portion provided in the first member 1 or the second member 2 and a communication mounting portion 9 such as a mounting hole or a mounting recess portion provided in the second member 2 or the first member 1 are arranged in communication with each other, a mounting case body 3 of the hinge device H is engaged with the case mounting portion 8 in a rotation preventing manner, and the mounting portion provided in the cam engagement portion 6 of the hinge device H or the cam engagement portion 6 is engaged and assembled under the rotation preventing condition with the communication mounting portion 9.

The hinge device H is provided with the cam portion 4 in the rotation preventing manner within the mounting case body 3. The cam portion 4 is provided slidably within the mounting case body 3 against the engagement biasing spring 5 provided within the mounting case body 3. A cam engagement portion 6 to be biased and engaged with the cam portion 4 by the engagement biasing spring 5 is provided in confrontation with the cam portion 4. The cam engagement portion 6 or a mounting portion provided in the cam engagement portion 6 is adapted to project on one side of the mounting case body 3. When the second member 2 is rotated to the first member 1, the cam portion 4 and the cam engagement portion 6 are disengaged and rotated relative to each other while separating the cam portion 4 against the engagement biasing spring 5, and the rotational position of the second member 2 to the first member is kept under the condition that the cam portion 4 and the cam engagement portion 6 are biased and engaged with each other. However, according to the present invention, the cam engagement portion 6 arranged on one side of the mounting case body 3 or the mounting portion provided in the cam engagement portion 6 is provided slidably and movably together with the cam portion 4 against the engagement biasing spring 5 toward the inside of the mounting case body 3, and the cam engagement portion 6 or the mounting portion may be provided in a fixed condition to the communication mounting portion 9 by the retracting movement caused by the sliding movement and the returning and restoring projecting motion by the engagement biasing spring 5 may be provided in a fixed condition to the communication mounting portion 9.

Accordingly, for example, after the mounting case body 3 has been engaged with the case mounting portion 8, the first member 1 and the second member 2 are assembled with each other so that the case mounting portion 8 and the communication mounting portion 9 are in communication with each other while the cam engagement portion 6 or the mounting portion is moved and retracted slidably together with the cam portion 4 against the engagement biasing spring 5 toward the inside of the mounting case body 3, the base portion of the second member is assembled, the cam engagement portion 6 or the mounting portion is projected again by the returning and restoring motion by the engagement biasing spring 5 so that the cam engagement portion 6 or the mounting portion is projected and engaged with the communication mounting portion 9 and the hinge device H may be mounted on a pivot portion between the first member 1 and the second member 2 with one action.

Accordingly, the cam engagement portion 6 projecting on one side of the mounting case body 3 or the mounting portion provided in this is adapted to be retracted and moved against the engagement biasing spring 5 in the same manner as in the cam portion 4 to provide a novel hinge device which may be mounted with one action by the retracting motion and the automatic returning and restoring motion without fixing the hinge device H with a discrete part and which is extremely superior in mounting work and in practical usability and an electronic instrument using the hinge device.

An embodiment of the present invention will now be described with reference to the drawings.

In this embodiment, a hinge device H according to the invention is provided in a pivot coupling portion between a body and a flip of a portable phone. A mounting hole is provided in a base portion of the flip (second member 2) to form a case mounting portion 8 and a mounting hole is provided in a base portion of the body (first member 1) to form a communication mounting portion 9. The base portions of the body (first member 1) and the flip (second member 2) are assembled with each other so that the case mounting portion 8 and the communication mounting portion 9 are in communication with each other. A rod-like hinge device H is inserted and arranged in the case mounting portion 8 and the communication mounting portion 9.

The mounting case body 3 of the hinge device H is inserted in this case mounting portion 8 in a rotation preventing manner. A cam engagement portion 6 of the hinge device H is inserted and engaged with the communication mounting portion 9 in a rotation preventing manner.

The hinge device H according to this embodiment will be described in more detail.

A cam portion 4 is provided within the mounting case body 3 in a rotation preventing manner. The cam portion 4 is provided slidably within the mounting case body 3 against an engagement biasing spring 5 provided within the mounting case body 4. A cam engagement portion 6 biased and engaged with the cam portion 4 by the engagement biasing spring 5 is provided in confrontation with the cam portion 4. This cam engagement portion 6 is provided projectingly on one side of the mounting case body 3. In this embodiment, any mounting portion is provided for the cam engagement portion 6 but the opposite portion of the cam engagement portion 6 where the engagement portion engages with the cam portion 4 on the inner side of the mounting case body 3 is adapted to project from one side of the mounting case body 3. This projecting portion is adapted to engage with the communication mounting portion 9 in a rotation preventing manner.

Accordingly, when the second member 2 is rotated relative to the first member 1, the cam portion 4 and the cam engagement portion 6 are disengaged and rotated relative to each other while the cam portion 4 is separated against the engagement biasing spring 5. Under the condition that the cam portion 4 and the cam engagement portion 6 are biased and engaged with each other, the rotational position of the second member 2 may be held relative to the first member 1.

Namely, in this embodiment, when the second member 2 (flip) is rotated relative to the first member 1 (body) from the closed condition to the open condition, the mounting case body 3 engaging with the case mounting portion 8 in the rotation preventing manner is rotated in accordance with the rotation of the second member 2. The cam portion 4 assembled in the mounting case body 3 in the rotation preventing manner is rotated to the cam engagement portion 6. This cam engagement portion 6 is fixed to the communication mounting portion 9 of the first member 1 in the rotation preventing manner.

Then, the cam portion 4 is rotated to the cam engagement portion 6, the cam portion 4 is disengaged from the cam engagement and rotated in a frictional manner while separating and moving away from the cam engagement portion 6 against the engagement biasing spring 5 within the mounting case body 3. It is possible to realize such a "free stop" that the second member 2 (flip) is stopped in a position when the hand is released in the disengagement rotational position depending upon a pressure of the engagement biasing spring 5 or a shape of the cam engagement. After the disengagement, a rotational biasing force for urging the cam engagement may be produced again by a slant of the frictional surface.

Namely, in the rotational range in which the first member 1 and the second member 2 are somewhat rotated, the cam engagement portion is not completely disengaged so that the return closing biasing force may take place. When the rotation occurs beyond this rotational range, the cam engagement is disengaged but the opening biasing force may take place so that the cam engagement may occur again by the slant of the frictional surface and the opening rotation may automatically take place to again form the cam engagement. As a result, the opening position may be held by the cam engagement.

Also, it is possible to set so that, under the condition that the first member 1 and the second member 2 are coupled and closed, the cam portion 4 and the cam engagement portion 6 are not completely cam engaged but kept in an engagement midway position as a result of which the closing biasing force may take place even in the closed condition.

In this embodiment, in such a hinge device H, the cam engagement portion 6 arranged on one side of the mounting case body 3 is provided slidably movably together with the cam portion 4 against the engagement biasing spring 5 toward the inside of the mounting case body 3, and the cam engagement portion 6 is adapted to automatically engage with the communication mounting portion 9 of the first member 1 in the rotation preventing manner by the retracting movement of the sliding movement and the returning and projecting movement of the engagement biasing spring 5.

Namely, the mounting case body 3 is inserted into the case mounting portion 8 so that it comes into contact with the bottom. The rotation preventing engagement is performed by setting up the hole shape and the case body shape. Thereafter, the cam engagement portion 6 projecting from the case mounting portion 8 is slidingly moved and retracted together with the cam portion 4 against the engagement biasing spring 5 toward the inside of the mounting case body 3, while the base portions of the first member 1 and the second member 2 are assembled with each other so that the case mounting portion 8 and the communication mounting portion 9 are in communication with each other. Thus, the cam engagement portion 6 is returned and restored to project again by the engagement biasing spring 5 so that the cam engagement portion 6 is automatically engaged with the communication mounting portion 9 (while the rotation preventing engagement is performed by setting up the hole shape of the communication mounting portion 9 and the outer configuration of the cam engagement portion 6). Thus, it is possible to mount the hinge device H to the pivot coupling portion between the first member 1 and the second member 2 with one action.

Accordingly, the cam engagement portion 6 projecting on one side of the mounting case body 3 is improved so that it may be retracted and moved to thereby provide a novel hinge device which may be mounted with one action by the retracting motion and the automatic returning and restoring motion without fixing the hinge device H with a discrete part and which is extremely superior in mounting work and in practical usability and an electronic instrument using the hinge device.

Also, in this embodiment, a rotary shaft 10 passing through the cam portion 4 and the cam engagement portion 6 which engage with each other is arranged in an axial direction within the mounting case body 3. The cam engagement portion 6 moving the inside of the mounting case body 3 against the engagement biasing spring 5 together with the cam portion 4 moving together with the rotary shaft 10 by pushing on the opposite side the cam engagement portion 6 provided on one end side of the rotary shaft 10 and engaging with the cam engagement portion 6 and projecting from one end side of the mounting case body 3 may be moved in the retracting direction.

More specifically, the cam engagement portion 6 is fitted at one end portion of the rotary shaft 10 while being engaged with a retainer portion 11 for preventing the movement toward the inside of the mounting case body 3. A pull-apart preventing portion 12 is formed to fit with a passing-through end portion of the rotary shaft 10 passing through the cam engagement portion 6. Thus, the rotary shaft 10 and the cam engagement portion 6 are kept under a fixed condition in the sliding direction.

Accordingly, the cam engagement portion 6 and the rotary shaft 10 are retracted and slidably moved toward the inside of the mounting case body 3 in a one-piece manner. Incidentally, in this case, an allowance recess portion 13 for allowing the rotary shaft 10 to move on the opposite side is provided on an insertion bottom side of the case mounting portion 8.

Conventionally, the coupling between the cam engagement portion and the rotary shaft has been performed by striking a spring pin from the outside to couple the cam engagement portion and the rotary shaft 10 with each other. Since the positions for the holes of the rotary shafts 10 for striking the spring pins are variously changed, the overall length is changed depending upon a product. Since the engagement biasing force by the engagement biasing spring 5 of the cam portion 4 is variously changed, there is a variation in a torque performance depending upon a product. However, in this respect, in the present embodiment, since the one-piece structure is attained by fitting the passing-through end of the cam engagement portion 6 of the rotary shaft 10, it is possible to obtain the stability in torque without any variation in overall length of the product to overcome the above-noted problems in addition to the reduction in cost by reducing the number of the parts.

Incidentally, the present invention is not limited to the specific embodiment but the specific structure of each component may be variously designed.

INDUSTRIAL APPLICABILITY

With such an arrangement according to the present invention, the cam engagement portion projecting on one side of the mounting case body or the mounting portion provided on this is improved so that it may be retracted and moved to thereby provide a novel hinge device which may be mounted with one action only by simply inserting, arranging and automatically returning and restoring action of the engagement biasing spring without fixing the hinge device with a discrete part and which is extremely superior in mounting work and in practical usability and an electronic instrument using the hinge device with an extremely simple structure and with ease.

What is claimed is:

1. A hinge device coupling a first member and a second member, in which a cam portion is provided within a mounting case body in a rotation preventing manner, the cam portion is provided slidably movably within the mounting case body against an engagement biasing spring provided within the mounting case body, a cam engagement portion for engaging with the cam portion by the engagement biasing spring is provided in confrontation with the cam portion, the cam engagement portion or a mounting portion provided in the cam engagement portion is provided projectingly on one side of the mounting case body, the mounting case body is provided in a fixed condition to either the first member or the second member, the cam engagement portion or the mounting portion provided in the cam engagement portion is provided in a fixed condition to the other member, when the second member is rotated relatively to the first member, the cam portion and the cam engagement portion are moved away and rotated to each other while the cam portion is pushed by the cam engagement portion against the engagement biasing spring and thereby a rotational position of the second member is held to the first member under the condition that the cam portion and the cam engagement portion are biased and engaged with each other, characterized in that, a rotary shaft passing through the cam portion and the cam engagement portion engaging with each other is arranged in an axial direction within the mounting case body, and the cam engagement portion or the mounting portion provided therein projecting from one end side of the mounting case body and moving toward the inside of the mounting case against the engagement biasing spring together with the rotary shaft by pushing on an opposite side the cam engagement portion or the portion therein provided on one end side of the rotary shaft or the mounting portion is adapted to move in a retracting direction, the mounting case body is adapted so that the mounting case body may be inserted and engaged with a case mounting portion comprising a mounting hole or a mounting recess portion provided in the first member or the second member and mounted in a fixed condition, an allowance recess portion for allowing the rotary shaft to project from the mounting case body is provided on an insertion bottom side of the case mounting portion, the cam engagement portion or the mounting portion provided in the cam engagement portion is projected, inserted, mounted and engaged in a fixed condition to a communication mounting portion comprising a mounting recess portion or a mounting hole in communication with the case mounting portion and provided in the other of the second member or the first member, after the mounting case body is engaged with the case mounting portion, the case mounting portion and the communication mounting portion are kept in communication with each other under the condition that the cam engagement portion or the mounting portion provided therein is moved slidably together with the cam portion against the engagement biasing spring toward the inside of the mounting case body and at the same time, the rotary shaft is projected from the mounting case body through said allowance recess portion of the case mounting portion and the cam engagement portion or the mounting portion provided therein is returned or restored by the engagement biasing spring so that the cam engagement portion or the mounting portion provided therein is engaged with the communication mounting portion and mounted on a pivot coupling portion of the first member and the second member.

2. An electronic instrument characterized in that a pivot coupling portion for the first member and the second member is provided with the hinge device as described in claim 1.

* * * * *